May 4, 1965  C. C. GAMBILL ETAL  3,182,228
CIRCUIT FOR REPEATEDLY ENERGIZING A LOAD
Filed March 5, 1962
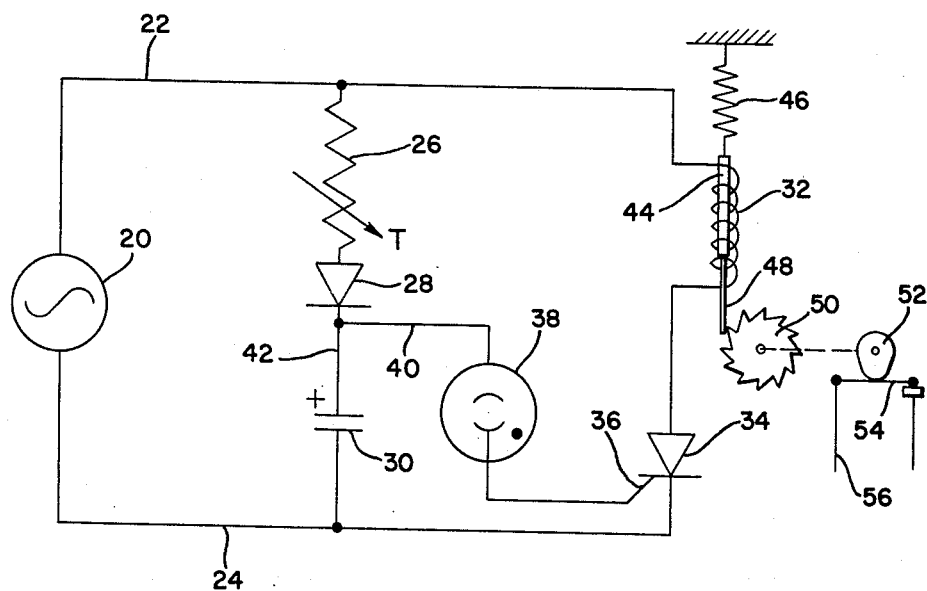
INVENTORS
Charles C. Gambill
John W. Murphy
BY
Carl A. Stickel
Their Attorney

United States Patent Office 3,182,228
Patented May 4, 1965

3,182,228
CIRCUIT FOR REPEATEDLY ENERGIZING A LOAD
Charles C. Gambill, Tipp City, and John W. Murphy, Dayton, Ohio, assignors to General Motors Corporation, Detroit, Mich., a corporation of Delaware
Filed Mar. 5, 1962, Ser. No. 177,334
5 Claims. (Cl. 317—148.5)

This invention relates to electrical apparatus and more particularly to a circuit arranged for repeatedly energizing in low frequency pulses an electrical load, such as a solenoid actuator, a pulsing timer, a heater for a bimetal operated device or switch or any other load which needs pulsing or average power from an alternating current source.

Low frequency pulsing direct current has many uses as indicated in the preceding paragraph.

It is an object of this invention to provide a simple inexpensive circuit which will provide a pulsing direct current in an electrical load from an alternating current supply source.

It is another object of this invention to provide a simple inexpensive circuit which will provide a selective control capable of varying the frequency over a wide range of a pulsating direct current in an electrical load from an alternating current supply source.

These and other objects are attained in the form shown in the drawing in which the output of an alternating current supply is connected to two branch circuits connected in parallel. In the one branch circuit is a resistance which may be a fixed or variable resistance, a diode rectifier which may be connected on either side of the resistance and a capacitor. In the second branch circuit is an electrical load and a silicon solid semiconductor controlled rectifier in series with each other. The gate of the silicon controlled rectifier is connected through a glow discharge tube or lamp to the first-mentioned branch circuit in between the capacitor and the diode rectifier or the resistance. When the capacitor is charged to firing voltage of the glow discharge tube, the glow discharge tube will fire and a sudden voltage is applied to the gate of the silicon controlled rectifier. This current is supplied by both the capacitor discharge and the amount of current supplied by the input voltage through the resistance. When the current into the gate is above the minimum value required, the silicon controlled rectifier will conduct and permit a pulse of current to flow through it and the load in this branch circuit.

Further objects and advantages of the present invention will be apparent from the following description, reference being had to the accompanying drawing wherein a preferred embodiment of the present invention is clearly shown.

In the drawing, the figure is a wiring diagram disclosing one form of our invention.

Referring now to the drawing, there is shown an alternating current supply source 20 connected to the supply conductors 22 and 24. In a first branch circuit, there is connected a resistance 26, a diode rectifier 28 and a capacitor 30. The resistance 26 may be a fixed resistance of 1.5 megohms, or the resistance 26 may be an adjustable resistance or a temperature-responsive resistance either of the positive or negative type. Also, the resistance 26 may be of a light-dependent or pressure-responsive type, if desired. The diode rectifier 28 may be connected to either end of the resistance 26. The diode rectifier 28 preferably is the IN2070 type, for example. The capacitor 30 has a ten microfarad, seventy volt rating. In the second branch circuit, there is an electrical load 32 connected in series with a silicon solid semiconductor controlled rectifier 2N1597 bearing the reference character 34. The gate 36 of the silicon controlled rectifier is connected to the glow discharge tube or lamp NE51 bearing the reference character 38. This lamp 38 is connected by the conductor 40 to the conductor 42 connecting the diode rectifier 28 with the capacitor 30. As one example of a load, there is shown a twenty-four volt alternating current relay having a resistance of 33 ohms and a current rating of 2.9 volt amperes. This relay includes a solenoid armature 44, normally pulled upwardly by a spring 46. The solenoid armature 44 has a projection 48 adapted to engage and rotate a ratchet wheel 50. The ratchet wheel 50 is connected to a rotatable cam 52 arranged to operate a switch 54 to closed and open positions in an electrical circuit 56.

Each time that the alternating current supply source 20 makes the conductor 22 positive with respect to the conductor 24 and, if this voltage is greater than the voltage to which the capacitor 30 is charged, the capacitor 30 is charged by an additional amount determined by the time constant of the capacitor 30 and the resistor or resistance 26. When the capacitor 30 is charged to the firing voltage of the glow tube 38, the glow tube 38 will fire and a sudden voltage will be applied through the gate 36 of the silicon, solid state, semi-conductor controlled rectifier 34. If the current to the gate 36 is above the minimum value required, the silicon, solid state, semiconductor controlled rectifier will conduct and provide one or more pulses of current through its branch circuit including the electrical load 32.

In a circuit having the values set forth above, the solenoid armature 44 will be attracted for two or three pulses and, in so doing, will move the projection 48 downwardly to advance the ratchet wheel 50 a distance of approximately one tooth. The current through the glow tube 38 to the gate 36 is supplied from both the capacitor 30 and the current supplied through the resistance 26 and the diode rectifier 28 directly from the supply conductor 22. The values of the capacitor 30, the resistor or resistance 26 and the glow lamp 38 are so chosen that the capacitor 30 will discharge faster than it can be recharged until the voltage across it does not exceed the firing voltage for current maintenance voltage of the glow lamp 38. This stops the flow of current to the gate 36 and stops the silicon controlled rectifier 34 from conducting a current. This deenergizes the electrical load 32 and releases the armature 44 so that it will be pulled upwardly by the spring 46 to the deenergized position of the electrical load 32. The silicon controlled rectifier 34 will not conduct again until the capacitor 30 is again charged sufficiently to fire the glow tube 38. In the circuit specifically described above, the capacitor 30 will not become sufficiently charged for about five or ten seconds after which the glow tube will discharge and again conduct to the gate 36 causing the silicon controlled rectifier 34 to conduct current again for two or three alternating current pulses providing current flow through the load 32.

By changing the values of the elements in the circuit and particularly the resistance of the resistor or resistance 26, this type of circuit can be used to cause the silicon controlled rectifier 34 to conduct for only a part of one half of an alternating current cycle or pulse and then to shut it off. To accomplish this, the resistor or resistance is made very low. By increasing the value of the resistance, the silicon controlled rectifier wil conduct for three or four consecutive half cycles of the alternating current supply before it shuts off. Increasing the value of the resistor 26 will also cause the circuit to cause the silicon controlled rectifier to conduct at the same point in the cycle every half cycle and never have a shut off of one complete cycle or more.

Instead of the resistance 26 being a fixed resistance, it may be any form of an adjustable resistance and particularly may be a temperature-responsive resistance or thermistor having either a positive or negative coefficient of resistance in order to provide a control which is responsive to temperature so that the pulse rate applied to the electrical load 32 for the average load power to the electrical load 32 will vary with temperature. When the circuit is arranged to fire or conduct on every positive impulse or swing of the voltage applied to the conductor 22, it may be used to supply an average power to the load 32. Such a circuit might have an electric heater substituted for the solenoid 32 which would be used to operate a temperature-responsive switch, such as a bimetal operated switch. The load 32 could be any form of heater used for a variety of purposes and, if the resistor 26 was temperature-responsive, it could provide a supply of heat in accordance with temperature conditions. The electrical load 32 could operate a timing device including a plurality of cams operating in sequence with the cam 52 to operate additional switches in various circuits similar to the switch 54 and the circuit 56.

While the embodiment of the present invention, as herein disclosed, constitutes a preferred form, it is to be understood that other forms might be adopted.

What is claimed is as follows:

1. In combination, first and second alternating current supply conductors, a first branch circuit comprising a resistance and a diode and a capacitor connected in series with each other across said supply conductors, a second branch circuit comprising an electrical load and a solid state controlled rectifier connected in series with each other across said supply conductors in parallel with said first branch circuit, said solid state controlled rectifier having a gate terminal, and a third branch circuit comprising a glow discharge tube connecting said gate terminal and said first branch circuit between said resistance and said capacitor, said controlled rectifier and said diode being oriented to direct the flow of current respectively through said second and first branch circuits from said first to said second supply conductor.

2. In combination, first and second alternating current supply conductors, a first branch circuit comprising a resistance and a diode and a capacitor connected in series with each other in the order named from said first to said second supply conductor, a second branch circuit comprising an electrical load and a solid state controlled rectifier connected in series with each other across said supply conductors in parallel with said first branch circuit, said solid state controlled rectifier having a gate terminal, and a third branch circuit comprising a glow discharge tube connecting said gate terminal and said first branch circuit between said diode and said capacitor, said controlled rectifier and said diode being oriented to direct the flow of current respectively through said second and first branch circuits from said first to said second supply conductor.

3. In combination, first and second alternating current supply conductors, a first branch circuit comprising a resistance and a diode and a capacitor connected in series with each other across said supply conductors, a second branch circuit comprising an electrical load and a solid state controlled rectifier connected in series with each other across said supply conductors in parallel with said first branch circuit, said solid state controlled rectifier having a gate terminal, and a third branch circuit comprising a glow discharge tube connecting said gate terminal and said first branch circuit between said diode and said capacitor, said resistance being a variable resistance.

4. In combination, first and second alternating current supply conductors, a first branch circuit comprising a resistance and a diode and a capacitor connected in series with each other across said supply conductors, a second branch circuit comprising an electrical load and a solid state controlled rectifier connected in series with each other across said supply conductors in parallel with said first branch circuit, said solid state controlled rectifier having a gate terminal, and a third branch circuit comprising a glow discharge tube connecting said gate terminal and said first branch circuit between said diode and said capacitor, said resistance being a temperature responsive resistance.

5. In combination, first and second alternating current supply conductors, a first branch circuit comprising a resistance and a diode and a capacitor connected in series with each other across said supply conductors, a second branch circuit comprising an electrical load and a solid state controlled rectifier connected in series with each other across said supply conductors in parallel with said first branch circuit, said solid state controlled rectifier having a gate terminal, and a third branch circuit comprising a glow discharge tube connecting said gate terminal and said first branch circuit between said diode and said capacitor, said electrical load being a solenoid and a ratcheting device operated by the solenoid.

References Cited by the Examiner

"A Survey of Some Circuit Applications of the Silicon Controlled Switch and Silicon Controlled Rectifier," Applications and Circuit Design Notes, Solid State Products, Incorporated, Bulletin D420-02-12-59, pages 8, 9, 10, 15, 16, 17.

"An Integrating Timer," Radio-Electronics, volume XXXI, No. 12, December 1960, pages 28 and 29.

SAMUEL BERNSTEIN, *Primary Examiner.*